March 21, 1939.  H. M. ULLSTRAND  2,151,451
REFRIGERATION
Filed Nov. 30, 1936
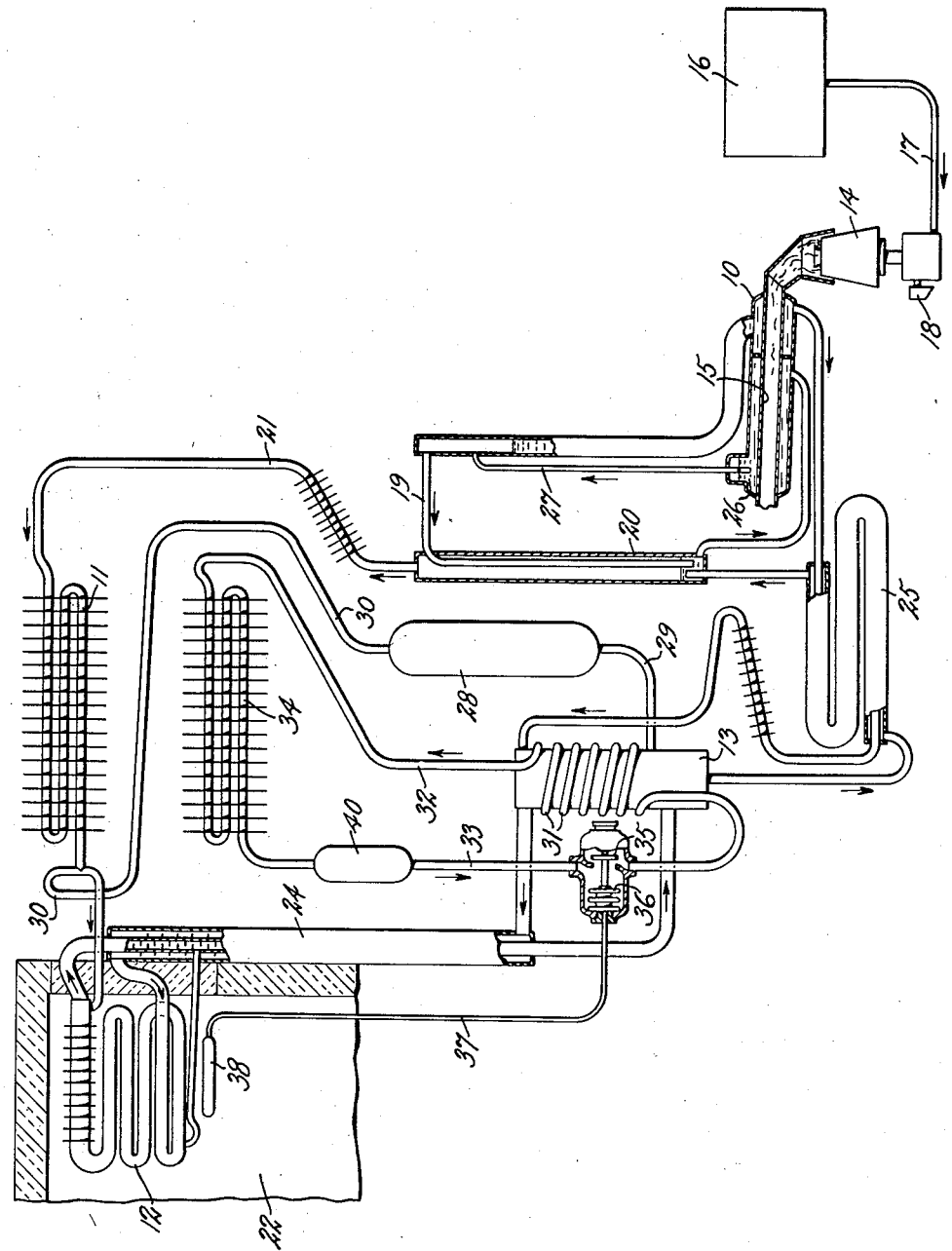
INVENTOR.
Hugo M. Ullstrand
BY
D. E. Heath
ATTORNEY.

Patented Mar. 21, 1939

2,151,451

UNITED STATES PATENT OFFICE 2,151,451

REFRIGERATION

Hugo M. Ullstrand, Evansville, Ind., assignor to Servel Inc., New York, N. Y., a corporation of Delaware Application November 30, 1936, Serial No. 113,420

7 Claims. (Cl. 62—5)

My invention relates to refrigeration and more particularly to absorption type refrigeration systems. It is an object of the invention to provide a new and useful arrangement for controlling the refrigeration temperature of absorption type refrigeration apparatus. The single figure of the drawing shows a continuous absorption type refrigeration system making use of evaporation of refrigerant fluid in the presence of an inert gas and embodying the invention. The system illustrated is provided with a heat source comprising a kerosene burner. The refrigeration temperature of this system could be controlled by controlling the kerosene burner but my invention provides a much simpler control arrangement which, moreover, may be used with any type of absorption refrigeration system.

The system illustrated is generally like that described in U. S. Patent 1,609,334 to von Platen and Munters and is made up of a number of steel vessels and pipes welded together to form an hermetically sealed system. All the spaces of the system are in open and unrestricted communication so that all parts are at the same total pressure. The system contains hydrogen and a water solution of ammonia. Other suitable fluids may be used.

The parts of the system include a generator 10, an ammonia condenser 11, an evaporator 12, and an absorber 13. The generator 10 is continuously heated by a kerosene burner 14 arranged so that the heat from the burner rises into the generator heating flue 15. The kerosene burner 14 is supplied with fuel from a suitable tank 16 which is connected to the burner by a conduit 17. The burner 14 may be manually adjusted by manipulation of an adjusting knob 18. Ammonia vapor expelled from solution by heat in the generator 10 flows through conduit 19, a rectifier 20, and conduit 21 into the ammonia condenser 11 where the ammonia is condensed to liquid. The liquid ammonia flows from the condenser 11 into the upper part of the evaporator 12 located in a refrigerator storage compartment 22.

Hydrogen circulates through and between the evaporator 12 and the absorber 13 by way of a gas heat exchanger 24. In the evaporator, the liquid ammonia evaporates and diffuses into the hydrogen, producing a refrigeration effect. In the absorber, ammonia vapor is absorbed out of the rich gas by weakened absorption solution. The gas circulation between the evaporator and absorber occurs as a result of the difference in weights of the columns of weak and rich gas, the column of gas flowing from the evaporator to the absorber and containing the greater amount of the heavier ammonia vapor being heavier than the column of weak gas flowing from the absorber to the evaporator.

The absorption solution is circulated through and between the generator 10 and absorber 13 by way of a liquid heat exchanger 25 and circulation of the solution is caused by the lifting action of vapor formed in chamber 26 of the generator which raises solution through a riser 27 into the upper part of the generator where the level is such that solution may overflow therefrom into the absorber.

A pressure vessel 28 is connected in a known manner to the absorber by a conduit 29 and also connected to the outlet end of the condenser 11 by a conduit 30. This pressure vessel or hydrogen reserve vessel stores excess hydrogen during medium and low room temperatures which is displaced into the evaporator-absorber gas circuit by ammonia vapor under high room temperature conditions.

The absorber 13 is cooled by a vaporization-condensation circuit comprising a cooling coil 31 arranged in thermal exchange relation with the absorber and connected by conduits 32 and 33 to a condenser 34. This circuit contains a suitable fluid, such as methyl chloride, which condenses in the condenser 34 and vaporizes in the absorber cooling coil 31 resulting in transfer of heat from the absorber to the air which cools the condenser 34. The vapor rises from the cooling coil 31 through conduit 32 to the upper end of the condenser 34, and liquid flows from the lower end of the condenser 34 through conduit 33 back to the cooling coil 31.

The temperature of the evaporator 12 in the refrigerator storage compartment may be controlled by controlling the temperature of the absorber 13. I control the temperature of the absorber 13 by controlling the circulation of fluid in the absorber cooling circuit. A valve 35 in conduit 33 controls flow of liquid through this conduit from the condenser 34 to the absorber cooling coil 31. The valve 35 is preferably an hermetically sealed valve operated by an expansible fluid thermostat comprising an expansible element 36 connected by a capillary tube 37 to a sensitive bulb 38 located in the refrigerator compartment and affected by the temperature of the evaporator 12. Decrease in temperature of the evaporator causes the thermostat to close the valve 35 and restrict or stop flow of liquid to the absorber cooling coil 31 so that the temperature of the absorber rises. Upon increase in temperature of the evaporator 12, the thermostat causes the valve 35 to open and resume supply of liquid to the absorber cooling coil 31. For adequate storage of liquid held back by the valve 35 an enlarged chamber 40 may be provided in the liquid line 33 between the condenser 34 and the valve 35.

What is claimed is:

1. Refrigeration apparatus comprising a refrigerant fluid circuit including a generator, a condenser, an evaporator, and an absorber, a heater for continuously heating said generator, a vaporization-condensation circuit for cooling said absorber having a vaporization portion in thermal exchange relation with the absorber and a condensation portion, a valve in said circuit for controlling flow of liquid from said condensation portion to said vaporization portion, and a thermostat for operating said valve responsive to a temperature affected by said evaporator.

2. Apparatus as set forth in claim 1 in which said condensation portion comprises a finned pipe coil condenser arranged to be cooled by air, said vaporization portion comprises a pipe coil in thermal conductive relation with the absorber, and said thermostat is of an expansible fluid type having a sensitive bulb in thermal exchange relation with the evaporator.

3. Continuous absorption refrigeration apparatus including a generator, a continuous heat source therefor, a condenser, an evaporator, an absorber, a vaporization-condensation system for cooling said absorber, and a thermostatic device for controlling flow of fluid in said absorber cooling circuit responsive to a temperature affected by said evaporator.

4. Refrigeration apparatus comprising a refrigerant fluid circuit including a generator, a condenser, an evaporator, and an absorber, in which circuit fluid may flow continuously in the same direction, a heater which continuously supplies heat to said generator, means for cooling said condenser, means for cooling said absorber, and means for independently regulating said absorber cooling means responive to a temperature condition affected by said evaporator.

5. The improvement in the art of refrigeration which consists in simultaneously evaporating, absorbing, and continuously distilling refrigerant fluid, and independently controlling the temperature of absorption responsive to a temperature condition affected by said evaporation.

6. Refrigeration apparatus as set forth in claim 4 in which said absorber cooling means is a vaporization-condensation system.

7. Refrigeration apparatus as set forth in claim 4 in which said absorber cooling means is a vaporization-condensation circuit, and said regulating means is a thermostatic device for controlling flow of fluid in said circuit responsive to a temperature condition affected by said evaporator.

HUGO M. ULLSTRAND.